United States Patent
Jha et al.

(10) Patent No.: US 12,330,807 B2
(45) Date of Patent: Jun. 17, 2025

(54) AIRCRAFT EXTERIOR ANTI-COLLISION LIGHT SYSTEM, AIRCRAFT, AND METHOD OF OPERATING AN EXTERIOR ANTI-COLLISION LIGHT SYSTEM

(71) Applicant: Goodrich Lighting Systems GmbH & Co. KG, Lippstadt (DE)

(72) Inventors: Anil Kumar Jha, Lippstadt (DE); Jens Leuschner, Möhnesee (DE); Martin Klaus, Salzkotten (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 264 days.

(21) Appl. No.: 18/303,719

(22) Filed: Apr. 20, 2023

(65) Prior Publication Data

US 2023/0339623 A1    Oct. 26, 2023

(30) Foreign Application Priority Data

Apr. 21, 2022    (EP) ..................... 22169196

(51) Int. Cl.
*B64D 47/06* (2006.01)
*H05B 45/10* (2020.01)

(52) U.S. Cl.
CPC ............. *B64D 47/06* (2013.01); *H05B 45/10* (2020.01); *B64D 2203/00* (2013.01)

(58) Field of Classification Search
CPC . F21V 23/0407; B64D 2203/00; B64D 47/06; F21Y 2115/10; F21W 2111/00; G08G 5/80
See application file for complete search history.

(56) References Cited

U.S. PATENT DOCUMENTS

| | | | |
|---|---|---|---|
| 3,903,501 | A | 9/1975 | Greenlee et al. |
| 7,356,618 | B2 | 4/2008 | Lienhart et al. |
| (Continued) | | | |

FOREIGN PATENT DOCUMENTS

| | | |
|---|---|---|
| CN | 103491677 A | 1/2014 |
| CN | 104837284 B | 7/2018 |
| (Continued) | | |

OTHER PUBLICATIONS

Abstract for CN103491677 (A), Published: Jan. 1, 2014, 1 page.
(Continued)

*Primary Examiner* — Monica C King
(74) *Attorney, Agent, or Firm* — CANTOR COLBURN LLP

(57) ABSTRACT

An aircraft exterior anti-collision light system includes a plurality of anti-collision lights and a bus, wherein each of the plurality of anti-collision lights is coupled to the bus. Each of the plurality of anti-collision lights comprises at least one light source and is configured to emit a sequence of light flashes (R, W). Each of the plurality of anti-collision lights is configured to carry out an initialization routine in response to an activation command. Each of the plurality of anti-collision lights is configured to transmit an activation status message on the bus, after the initialization routine has been carried out. Each of the plurality of anti-collision lights is configured to listen on the bus for activation status messages and to log activation status messages received on the bus. Each of the plurality of anti-collision lights is configured to set a timing of (R, W) depending on the activation status messages.

16 Claims, 5 Drawing Sheets

(56) References Cited

U.S. PATENT DOCUMENTS

| | | | |
|---|---|---|---|
| RE46,430 E | 6/2017 | Sibert | |
| 10,086,953 B1* | 10/2018 | Li | H05B 45/30 |
| 10,556,706 B2 | 2/2020 | Johannessen et al. | |
| 11,059,603 B2 | 7/2021 | Trinschek | |
| 2014/0028189 A1 | 1/2014 | Eckel et al. | |
| 2014/0185280 A1* | 7/2014 | Peck | F21V 23/02 |
| | | | 362/244 |
| 2016/0071377 A1 | 3/2016 | Ford | |
| 2017/0245331 A1* | 8/2017 | Barker | H05B 47/24 |

FOREIGN PATENT DOCUMENTS

| | | |
|---|---|---|
| CN | 113260129 B | 11/2021 |
| EP | 3825234 A1 | 5/2021 |

OTHER PUBLICATIONS

Abstract for CN113260129 (B), Published: Nov. 12, 2021, 1 page.
Abstract of CN104837284 (B), Published: Jul. 20, 2018, 1 page.
Extended European Search Report for Application No. 22169196.7, mailed Sep. 20, 2022, 10 pages.

* cited by examiner

AIRCRAFT EXTERIOR ANTI-COLLISION LIGHT SYSTEM, AIRCRAFT, AND METHOD OF OPERATING AN EXTERIOR ANTI-COLLISION LIGHT SYSTEM

CROSS-REFERENCE TO RELATED APPLICATIONS

This application claims priority to European Patent Application No. 22169196.7 filed Apr. 21, 2022, the entire contents of which is incorporated herein by reference.

TECHNICAL FIELD

The present invention is in the field of aircraft exterior lights. The present invention is in particular in the field of aircraft exterior anti-collision lights.

BACKGROUND

Almost all aircraft are equipped with aircraft lights, including exterior aircraft lights, which are installed on the outside of the aircraft, and interior aircraft lights, which are installed within the aircraft. Exterior aircraft lights may include navigation lights, take-off lights, taxi lights, runway turn-off lights, landing lights, logo lights, cargo loading lights, wing scan lights, engine scan lights, and search lights. Exterior aircraft lights may in particular include exterior anti-collision lights, which may comprise white strobe anti-collision lights and red-flashing beacon lights.

The exterior anti-collision lights are synchronized, so that all white strobe anti-collision lights flash synchronously with each other, and that all red-flashing beacon lights flash synchronously with each other, respectively. Further, the white strobe anti-collision lights flash in an alternating manner with the red-flashing beacon lights. In previous approaches, the synchronization of the exterior anti-collision lights tends to be cumbersome and tends to require large effort.

SUMMARY

Accordingly, it would be beneficial to provide an aircraft exterior anti-collision light system that may provide a reliable and inexpensive framework for synchronizing a plurality of white strobe anti-collision lights and/or for synchronizing a plurality of red-flashing beacon lights, wherein the white strobe anti-collision lights may flash in an alternating manner with the red-flashing beacon lights.

According to an exemplary embodiment of the invention, an aircraft exterior anti-collision light system comprises a plurality of anti-collision lights and a bus. Each of the plurality of anti-collision lights is coupled to the bus. The bus may by a data bus, such as a CAN bus or an RS-485 bus.

Each of the plurality of anti-collision lights comprises at least one light source and is configured to emit a sequence of light flashes. The sequence of light flashes, which is emitted by each of the plurality of anti-collision lights, may in particular be a periodic sequence of light flashes having a set frequency.

The plurality of anti-collision lights may be activated by at least one activation command.

Each of the plurality of anti-collision lights is configured to carry out an initialization routine in response to receiving an according activation command. The initialization routine may include powering up the respective anti-collision light, testing internal components of the respective anti-collision light, and/or coupling the respective anti-collision light with the bus for data transmission. The activation command may be received via the bus or via a separate command line or via a wireless command channel or in any other suitable manner. Each of the plurality of anti-collision lights is configured to receive the activation command and/or to interpret a predefined event, such as a power up of the anti-collision light, as the activation command.

Each of the plurality of anti-collision lights is further configured to transmit an activation status message, which indicates that the initialization routine has been successfully completed, on the bus, after the initialization routine has been completed.

Each of the plurality of anti-collision lights is configured to listen on the bus for activation status messages, to log activation status messages received on the bus, and to set a timing of the sequence of light flashes depending on the activation status messages received on the bus, so that the sequences of light flashes, which are emitted by the plurality of anti-collision lights, are synchronized with each other. The terminology of logging activation status messages may include any one or any subset or all of saving/storing the activation status messages, counting the activation status messages, recording selected metadata of the activation status messages, such as recording origin and reception time of the activation status messages, etc., The activation status messages, as logged by a particular anti-collision light, may include activation status messages, which are issued by other anti-collision lights, and the activation status message, which was issued by the particular anti-collision light itself.

Exemplary embodiments of the invention also include a method of operating an aircraft exterior anti-collision light system, the aircraft exterior anti-collision light system comprising a plurality of anti-collision lights that are coupled to a common bus. The method includes for each of the plurality of anti-collision lights: carrying out an initialization routine in response to receiving an activation command; transmitting an activation status message on the bus, after the initialization routine has been carried out; listening on the bus for activation status messages and logging activation status messages received on the bus; and emitting a sequence of light flashes, wherein a timing of the sequence of light flashes is set depending on the activation status messages received on the bus.

Exemplary embodiments of the invention further include an aircraft, in particular an airplane or a rotorcraft, which comprises an aircraft exterior anti-collision light system according to an exemplary embodiment of the invention.

Exemplary embodiments of the invention may allow for synchronizing the sequences of light flashes, which are emitted by the plurality of anti-collision lights of an aircraft exterior anti-collision light system, via a bus, to which the anti-collision lights are coupled. A need for providing additional synchronization lines, extending between the anti-collision lights for transmitting synchronization signals, may be eliminated. The bus, which may be present anyway for the gathering/distribution of data among the exterior aircraft lights of the aircraft or which may be used for additional functions, is a reliable means of exchanging communication between the plurality of anti-collision lights. With the logging of activation status messages and with the setting of the flash timing in response to the receiving of the activation status messages, an effective and reliable way of achieving synchronization among the anti-collision lights via the bus communication may be achieved. Less wiring may be needed for anti-collision light synchronization, and, as a result, the weight and the costs of an aircraft, which is equipped with an aircraft exterior anti-collision light system according to an exemplary embodiment of the invention, may be reduced.

In an embodiment, the light sources are LEDs or comprise at least one LED, respectively. Each of the plurality of anti-collision lights may further comprise at least one optical element, such as a lens and/or a reflector, for forming the light output, which is emitted by the respective anti-collision light.

In an embodiment, each of the anti-collision lights is configured to receive its respective activation command via the bus.

In an embodiment, each of the anti-collision lights is configured to receive its respective activation command via an optional command line, which may be provided in addition to the bus.

In an embodiment, each of the anti-collision lights is configured to receive its respective activation command via wireless data transmission.

In an embodiment, the activation command(s) may be issued by and received from an external entity, such as from an aircraft board computer after an according trigger from the pilot/crew.

In an embodiment, the activation commands may be issued implicitly by supplying electrical power to the anti-collision lights. In other words, in such an embodiment, each of the anti-collision lights starts its respective initialization routine as soon as it is supplied with electrical power.

A common activation command may be issued to all anti-collision lights. Alternatively, separate activation commands may be issued individually to the anti-collision lights. Issuing separate activation commands may allow for activating the anti-collision lights independently of each other.

In an embodiment, setting the timing of the sequence of light flashes includes that each of the plurality of anti-collision lights is configured to start its respective sequence of light flashes a pre-set time period after the last activation status message of all respective activation status messages from a predefined set of the plurality of anti-collision lights has been received. Such a configuration may result in an effective and reliable synchronization of the sequences of light flashes, which are emitted by the plurality of anti-collision lights or, at least, by the predefined set of the plurality of anti-collision lights. The predefined set may include all of the plurality of anti-collision lights or a subset of the plurality of anti-collision lights, such as a predefined group of anti-collision lights, as laid out below.

In an embodiment, logging the activation status messages includes that each of the plurality of anti-collision lights saves and/or stores all activation status messages themselves. Logging the activation status messages may also include that each of the plurality of anti-collision lights counts the messages on the bus and/or records reduced information and/or records the reception times of the messages on the bus. Said reduced information may include the information that a message from a specific anti-collision light has been received. Reducing the information, which is recorded by the anti-collision lights, reduces the storage space that needs to be provided by each of the anti-collision lights and/or reduces the data processing complexity that needs to be coped with by each of the anti-collision lights. As a result, the costs of the anti-collision lights may be reduced.

In an embodiment, the plurality of anti-collision lights include a plurality of white strobe anti-collision lights and/or a plurality of red-flashing beacon lights.

In an embodiment, the aircraft exterior anti-collision light system comprises a first group of anti-collision lights and a second group of anti-collision lights.

In an embodiment, the first group of anti-collision lights comprises a plurality of red-flashing beacon lights, and the second group of anti-collision lights comprises a plurality of white strobe anti-collision lights.

In an embodiment, the anti-collision lights of both groups may be activated by the same activation command. Alternatively, the first group of anti-collision lights may be activated by a first activation command, and the second group of anti-collision lights may be activated by a second activation command. Issuing separate activation commands may allow for activating the first and second groups of anti-collision lights independently of each other. For example, the red-flashing beacon lights may be activated when the engines of the aircraft are turned on, while the white strobe anti-collision lights may be activated when the aircraft is close to take-off.

Each of the first group of anti-collision lights may be configured to start its sequence of light flashes a pre-set first time period after the last one of respective activation status messages have been received from the first group of anti-collision lights; and each of the second group of anti-collision lights may be configured to start its sequence of light flashes a pre-set second time period after the last one of respective activation status messages have been received from the second group of anti-collision lights. Such a configuration may provide for a highly effective implementation of an aircraft exterior anti-collision light system, which includes two groups of anti-collision lights, wherein the anti-collision lights of each group flash synchronously with each other.

In an embodiment, the anti-collision lights of the first and second groups are configured to emit the respective sequences of light flashes with the same frequency.

In an embodiment, each of the first group of anti-collision lights is configured to re-start its sequence of light flashes the pre-set first time period after the last one of respective activation status messages has been received from the second group of anti-collision lights. In this way, a highly effective implementation of the aircraft exterior anti-collision light system may be achieved where the anti-collision lights of the first and second groups flash in an alternating manner with respect to each other. In particular, on the re-starting of the flash sequences of the first group of anti-collision lights on the basis of the activation status messages of the second group of anti-collision lights may allow for a highly efficient coordination between the two groups of anti-collision lights without additional signalling overhead.

In an embodiment, a difference between the pre-set first time period and the pre-set second time period is in the range between 25% and 75% of a time interval between successive light flashes. The difference between the pre-set first time period and the pre-set second time period may in particular be approximately 25%, 33%, 50%, 67%, or 75% of the time interval between successive light flashes.

In an embodiment, the plurality of red-flashing beacon lights include at least one upper red-flashing beacon light, which is installed in an upper portion of the aircraft, in particular on top of a fuselage or at the top of a vertical stabilizer of the aircraft.

In an embodiment, the plurality of red-flashing beacon lights include at least one lower red-flashing beacon light, which is installed in a lower portion of the aircraft. The at least one lower red-flashing beacon light may in particular be mounted to the bottom of the fuselage.

In an embodiment, the plurality of red-flashing beacon lights include a right wing red-flashing beacon light, a left wing red-flashing beacon light and a tail red-flashing beacon light. In this case, the plurality of red-flashing beacon lights may also include at least one additional red-flashing beacon light. The one or more additional red-flashing beacon lights may be installed at the bottom of the fuselage and/or on one or both of the side walls of the fuselage. As the red-flashing beacon lights are usually activated when the engines of the aircraft are started, such additional red-flashing beacon lights may help to inform and warn ground personnel in the vicinity of the aircraft that the engines have been started.

In an embodiment, the light output of the red-flashing beacon lights is perceived as a sequence of red light flashes in a given viewing direction. The red-flashing beacon lights may be configured to flash with a frequency in the range of between 45 and 90 flashes per minute, in particular, with a frequency in the range of between 55 and 65 flashes per minute, more particularly with a frequency of 60 flashes per minute.

In an embodiment, the plurality of white strobe anti-collision lights include at least a left wing white strobe anti-collision light, which is installed in a left wing, in particular in a tip of the left wing of the aircraft, a right wing white strobe anti-collision light, which is installed in a right wing, in particular in a tip of the right wing of the aircraft, and a tail white strobe anti-collision light, which is installed at the tail of the aircraft.

The white strobe anti-collision lights may be configured to emit respective sequences of white light flashes during normal operation of the aircraft. It is also possible that the white strobe anti-collision lights are only operated during night and/or in bad weather conditions.

In an embodiment, the white strobe anti-collision lights are configured to flash with a frequency in the range of between 45 and 90 flashes per minute, in particular with a frequency in the range of between 55 and 65 flashes per minute, more particularly with a frequency of 60 flashes per minute. The white strobe anti-collision lights may in particular be configured to flash with the same frequency as the red-flashing beacon lights.

In an embodiment, the flashes of the white strobe anti-collision lights and the red-flashing beacon lights have a pulse length in the range of between 150 ms and 250 ms, in particular a pulse length in the range of between 180 ms and 220 ms, more particularly a pulse length of 200 ms, respectively.

In an embodiment, a bus clock signal is provided on the bus, and each of the plurality of anti-collision lights is configured to track the bus clock signal and to use said bus clock signal for maintaining a constant flash frequency for the sequence of light flashes.

More specifically, each of the plurality of exterior aircraft lights may, in operation, listen to the bus for detecting the bus clock signal provided on the bus, count the detected pulses of the pulse clock signal, and emit a light flash every time a predefined number of pulses have been counted.

Using the bus clock signal for synchronizing the flashing of the anti-collision lights may allow for maintaining the synchronization of the flashes, which are emitted by the anti-collision lights, reliably and with high accuracy.

In an embodiment, the bus is an RS-485 bus, which is a clocked bus.

In an embodiment, the bus clock signal, which is provided on the bus, has a clock frequency in the range of between 1 kHz and 3000 kHz, more particularly a clock frequency in the range of between 500 kHz and 2000 kHz.

In an embodiment, each of the plurality of anti-collision lights comprises a timer circuit and is configured to use an output, which is provided by said timer circuit, for maintaining a constant flash frequency for the sequence of light flashes. Each of the plurality of anti-collision lights may in particular be configured to emit a light flash based on a trigger, which is periodically output by the timer circuit.

In an embodiment, each timer circuit comprises a real time clock, which, in operation, provides a sequence of periodic clock signals. The periodic clock signals, which are provided by the real time clocks of the anti-collision lights, may have the same frequency. Each of the plurality of anti-collision lights may further comprise a counter for counting the clock signals provided by the respective real time clock. The counter may trigger the emission of a light flash of the respective anti-collision light every time a predefined number of clock signals has been counted.

The real time clocks may provide clock signals having a frequency in the range of between 1 kHz and 3000 kHz, more particularly with a frequency in the range of between 500 kHz and 2000 kHz.

Using timer circuits with real time clocks for synchronizing the flashing of the anti-collision lights may allow for synchronizing the flashing of the anti-collision lights independently of the availability of a bus clock signal. The synchronization of the anti-collision lights may be maintained, even if no bus clock signal is provided, or if the connection between an anti-collision light and the bus is interrupted.

In an embodiment, the bus is a CAN bus or another suitable bus that does not operate on a bus clock.

BRIEF DESCRIPTION OF DRAWINGS

Further exemplary embodiments of the invention are described below with respect to the accompanying drawings, wherein.

DETAILED DESCRIPTION OF DRAWINGS

Figure 1:
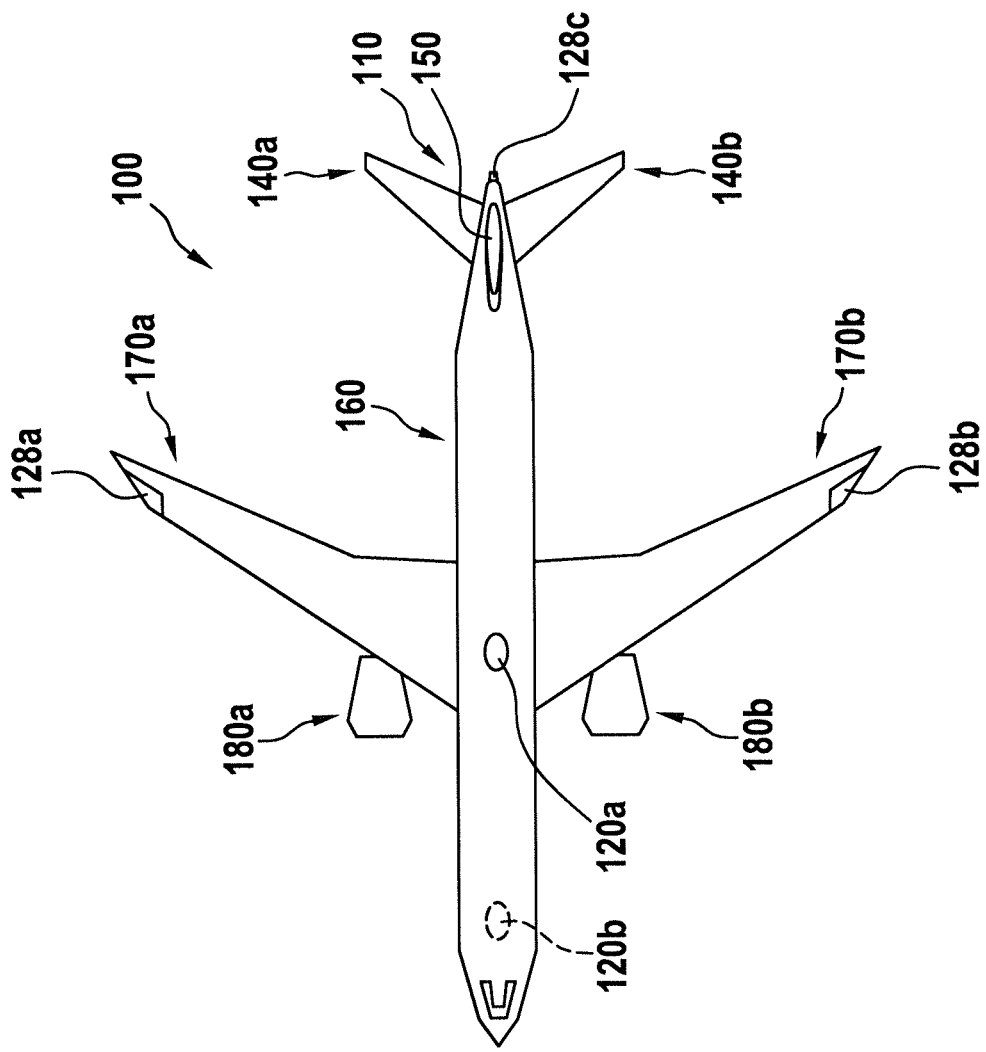
FIG. 1 shows a schematic top view of an aircraft, which is equipped with an aircraft exterior anti-collision light system according to an exemplary embodiment of the invention.
Figure 2:
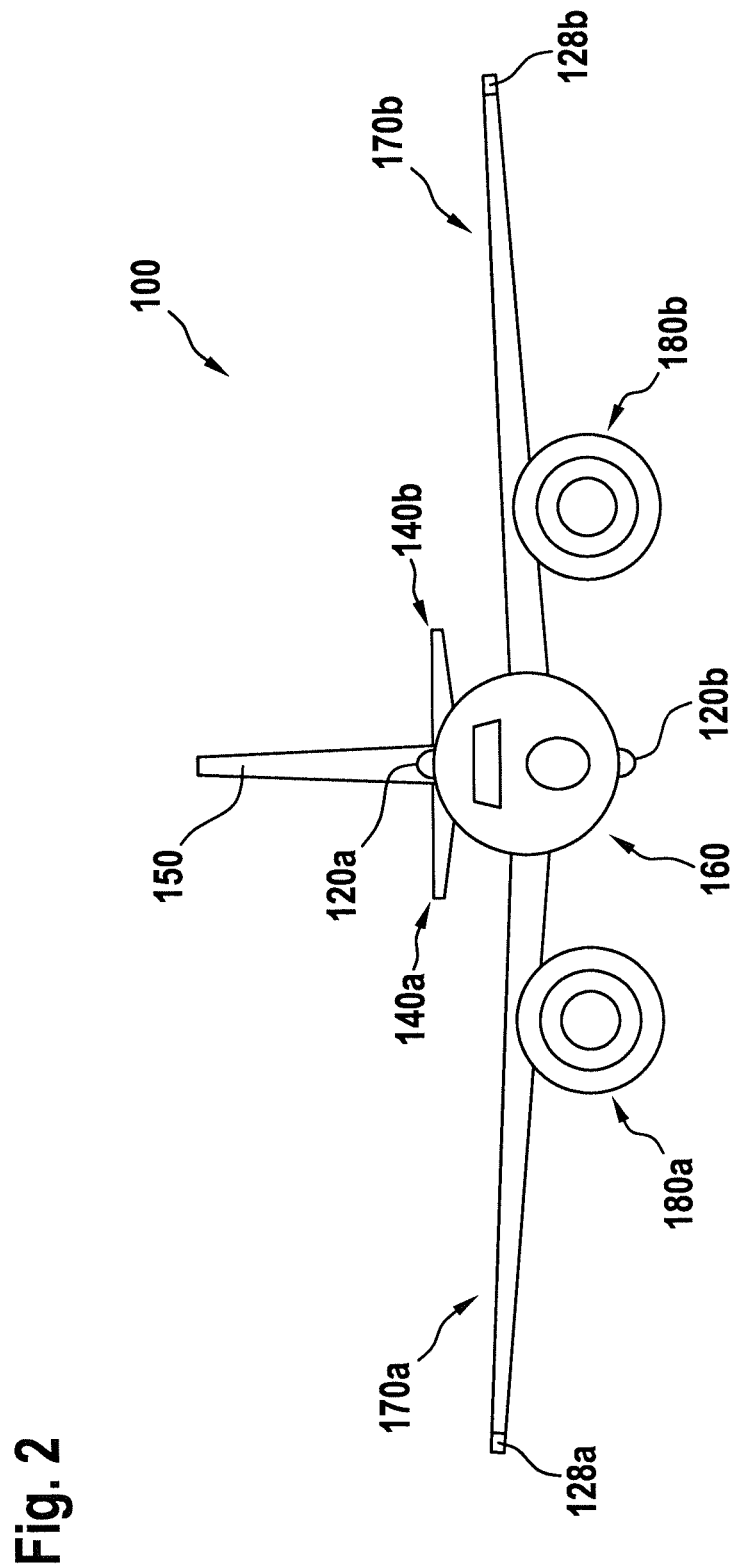
FIG. 2 shows a schematic front view of the aircraft shown in FIG. 1.

FIG. 1 shows a schematic top view of an aircraft 100, in particular of a passenger airplane 100, from a position above the aircraft 100. FIG. 2 shows a schematic front view of the aircraft 100.

The aircraft 100 comprises a fuselage 160 and two wings 170a, 170b extending laterally from the fuselage 160. A respective engine 180a, 180b is attached to each of the wings 170a, 170b.

The aircraft 100 further comprises two horizontal stabilizers 140a, 140b and a vertical stabilizer 150, which are mounted to an aft section of the fuselage 160.

The aircraft 100 is equipped with a variety of exterior aircraft lights.

Out of all the exterior aircraft lights, which may be provided at the exterior of an aircraft 100, only white strobe anti-collision lights 128a, 128b, and 128c and red-flashing beacon lights 120a, 120b are depicted in FIGS. 1 and 2.

The aircraft 100 may be equipped with additional exterior lights, which may in particular include at least one of navigation lights, logo lights, wing scan lights, engine scan lights, runway turnoff lights, cargo loading lights, landing lights, and/or take-off lights. For clarity and simplicity of the illustration and description, all these additional types of exterior lights are not depicted in FIGS. 1 and 2.

The aircraft 100 shown in FIGS. 1 and 2 is equipped with an upper red-flashing beacon light 120a, which is installed in an upper portion of the aircraft 100, in particular on top of the fuselage 160. In an alternative configuration, the upper red-flashing beacon light 120a may be installed in an upper portion of the vertical stabilizer 150, in particular on top of the vertical stabilizer 150.

The aircraft 100 further comprises a lower red-flashing beacon light 120b, which is installed in a lower portion of the aircraft 100. The lower red-flashing beacon light 120b may in particular be mounted to the bottom of the fuselage 160.

Although only one lower red-flashing beacon light 120b is depicted in FIGS. 1 and 2, the aircraft 100 may comprise two or more lower red-flashing beacon lights 120b, which may be installed at different positions along the longitudinal extension of the fuselage 160. A first lower red-flashing beacon light may, for example, be mounted to a front portion of the fuselage 160 close to the front gear (not shown) of the aircraft 100, and a second lower red-flashing beacon light may, for example, be mounted to a middle portion of the fuselage 160 close to the main gear (not shown) of the aircraft 100 and/or to an aft portion of the fuselage below the horizontal and vertical stabilizers 140a, 140b, 150.

In alternative configurations, red-flashing beacon lights may be installed at the tips of the wings 170a, 170b and at the tail 110 of the aircraft 100, potentially supplemented by red-flashing beacon lights on the side walls of the fuselage 160 and/or on the bottom of the fuselage 160.

Commonly, the red-flashing beacon lights 120a, 120b are switched on when the engines 180a, 180b are started, such that the emitted sequences of light flashes may help to inform and warn ground personnel in the vicinity of the aircraft 100 that the engines 180a, 180b have been started.

The output of the red-flashing beacon lights 120a, 120b is perceived as a sequence of red light flashes in a given viewing direction. The red-flashing beacon lights 120a, 120b usually flash with a flash frequency flash in the range of between 45 and 90 flashes per minute, in particular with a flash frequency flash in the range of between 55 and 65 flashes per minute, more particularly with a flash frequency flash of 60 flashes per minute. The red-flashing beacon lights 120a, 120b are synchronized, in order to flash simultaneously.

The aircraft 100 is further equipped with at least three white strobe anti-collision lights 128a, 128b, and 128c.

First and second white strobe anti-collision lights 128a, 128b are installed in the wings 170a, 170b, in particular in the respective tips of the wings 170a, 170b. A third white strobe anti-collision light 128c is installed at the tail 110 of the aircraft 100.

The white strobe anti-collision lights 128a-128c emit respective sequences of white light flashes during normal operation of the aircraft 100. It is also possible that the white strobe anti-collision lights 128a-128c are only operated during the night and in bad weather conditions.

The white strobe anti-collision lights 128a-128c usually flash with a flash frequency flash in the range of between 45 and 90 flashes per minute, in particular with a flash frequency flash in the range of between 55 and 65 flashes per minute, more particularly with a flash frequency flash of 60 flashes per minute.

The white strobe anti-collision lights 128a-128c are synchronized for flashing simultaneously. Additionally, the flashes of the white strobe anti-collision lights 128a-128c are offset with respect to the flashes of the red-flashing beacon lights 120a, 120b, i.e. the white strobe anti-collision lights 128a-128c flash in between the flashes of the red-flashing beacon lights 120a, 120b, and vice versa.

The flashes of the white strobe anti-collision lights 128a-128c and the flashes of the red-flashing beacon lights 120a, 120b may have a pulse length in the range of between 150 ms and 250 ms, in particular a pulse length in the range of between 180 ms and 220 ms, more particularly a pulse length of 200 ms.

Figure 3:
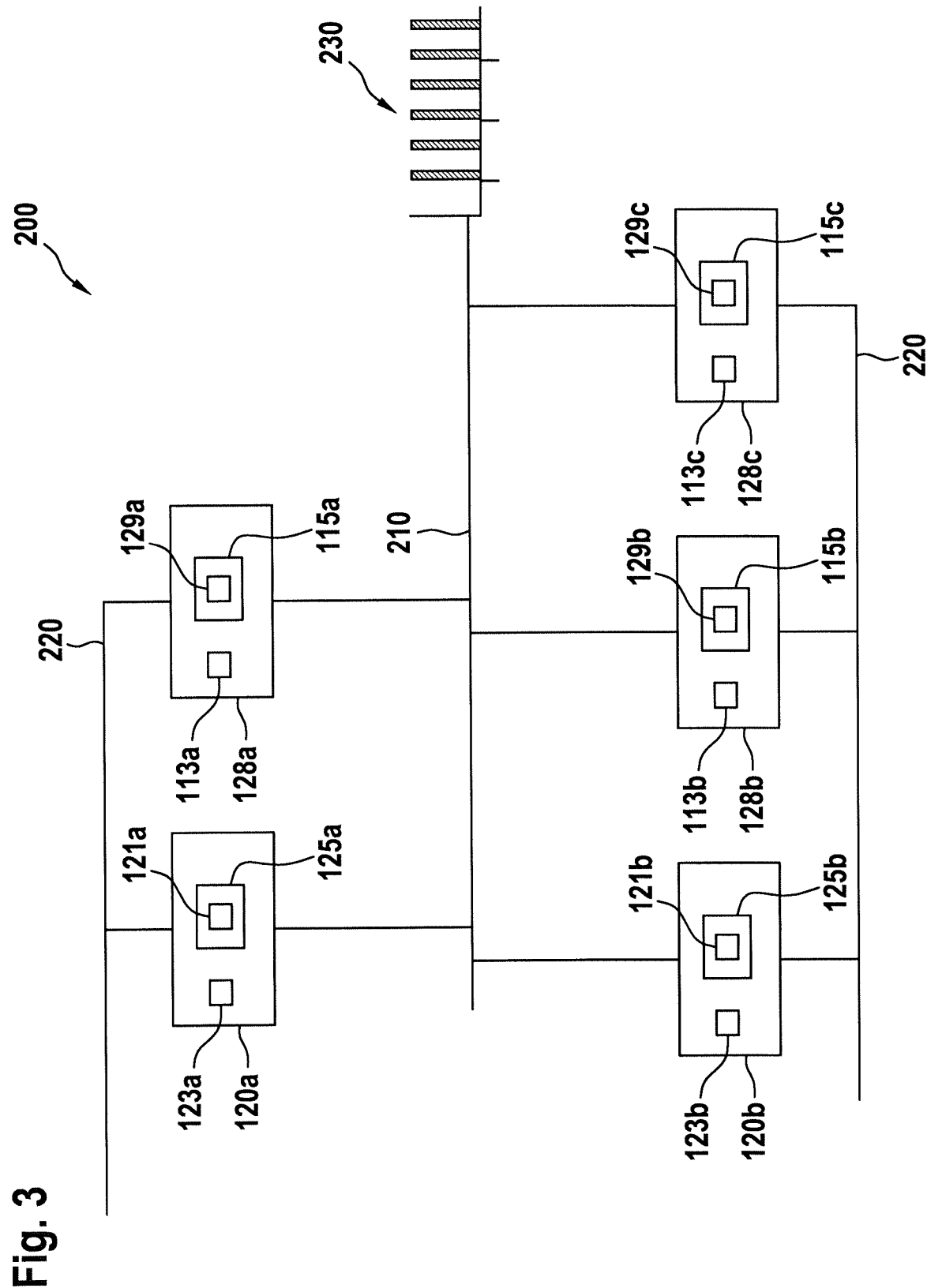
FIG. 3 depicts a schematic block diagram of an aircraft exterior anti-collision light system according to an exemplary embodiment of the invention.

FIG. 3 depicts a schematic block diagram of an aircraft exterior anti-collision light system 200 according to an exemplary embodiment of the invention. The aircraft exterior anti-collision light system 200 comprises a plurality of anti-collision lights 120a, 120b, 128a-128c, in particular two red-flashing beacon lights 120a, 120b and three white strobe anti-collision lights 128a-128c.

As mentioned before, the given numbers of red-flashing beacon lights and white strobe anti-collision lights are only exemplary, the aircraft exterior anti-collision light system 200 may comprise other, in particular larger, numbers of anti-collision lights as well.

Each of the plurality of anti-collision lights 120a, 120b, 128a-128c comprises at least one light source 121a, 121b, 129a-129c and is configured for emitting a sequence of light flashes. The light sources 121a, 121b, 129a-129c may be LEDs or they may comprise LEDs. Each of the plurality of anti-collision lights 120a, 120b, 128a-128c may further comprise at least one optical element 115a-115c, 125a, 125b, which may include at least one of a lens and/or a reflector for forming the light output, which is emitted by the respective anti-collision light 120a, 120b, 128a-128c.

As mentioned before, the red-flashing beacon lights 120a, 120b are configured for emitting red light flashes, and the white strobe anti-collision lights 128a-128c are configured for emitting white light flashes.

The aircraft exterior anti-collision light system 200 further comprises a bus 210, in particular a data bus, such as a CAN bus or an RS-485 bus, and each of the plurality of anti-collision lights 120a, 120b, 128a-128c is coupled to said bus 210, so that each of the plurality of anti-collision lights 120a, 120b, 128a-128c is capable of transmitting messages on the bus 210 and receiving messages from said bus 210.

In response to an activation command, which activates the respective anti-collision light 120a, 120b, 128a-128c, each of the plurality of anti-collision lights 120a, 120b, 128a-128c is configured to carry out an initialization routine.

The anti-collision lights 120a, 120b, 128a-128c may receive their respective activation commands via the bus 210, or via an optional command line 220, which is provided separate from the bus 210. The anti-collision lights 120a, 120b, 128a-128c may also be configured for receiving their respective activation commands via wireless data transmission. The activation commands may also be issued implicitly, e.g. by supplying electrical power to the anti-collision lights 120a, 120b, 128a-128c.

A common activation command may be issued to all anti-collision lights 120a, 120b, 128a-128c. Alternatively, separate activation commands may be issued to the white strobe anti-collision lights 128a-128c and to the red-flashing beacon lights 120a, 120b. Issuing separate activation commands to separate groups of anti-collision lights may allow for activating the white strobe anti-collision lights 128a-128c and the red-flashing beacon lights 120a, 120b independently of each other.

It is also possible that an individual activation command is issued to each of the white strobe anti-collision lights 128a-128c and to each of the red-flashing beacon lights 120a, 120b, respectively, in order to allow for an individual activation of each of the anti-collision lights 120a, 120b, 128a-128c.

The initialization routine may include powering up the anti-collision lights 120a, 120b, 128a-128c, testing internal components of the anti-collision lights 120a, 120b, 128a-128c, and/or coupling the anti-collision lights 120a, 120b, 128a-128c with the bus 210, in order to allow the anti-collision lights 120a, 120b, 128a-128c to send and receive messages via the bus 210.

Each of the plurality of anti-collision lights 120a, 120b, 128a-128c is further configured for indicating that the respective anti-collision light 120a, 120b, 128a-128c has been successfully initialized by transmitting an activation status message on the bus 210, after the initialization routine has been successfully completed.

Each of the plurality of anti-collision lights 120a, 120b, 128a-128c is also configured for listening on the bus 210 for activation status messages and to log any activation status messages received on the bus 210. The activation status messages may include activation status messages, which are issued by other anti-collision lights, and the activation status message, which was issued by the respective anti-collision light itself.

Logging the activation status messages may include that each of the plurality of anti-collision lights 120a, 120b, 128a-128c saves and/or stores all detected messages themselves.

Logging the activation status messages may also include that each of the plurality of anti-collision lights 120a, 120b, 128a-128c counts the messages on the bus 210 and/or records reduced information and/or records the reception time of the messages on the bus 210. Said reduced information may include the information that a message from a specific anti-collision light 120a, 120b, 128a-128c has been received.

Each of the plurality of anti-collision lights 120a, 120b, 128a-128c is further configured to set a timing of the sequence of light flashes, which are emitted by the respective anti-collision light 120a, 120b, 128a-128c, depending on the activation status messages received on the bus 210, so that the sequences of light flashes, which are emitted by the plurality of anti-collision lights 120a, 120b, 128a-128c, are synchronized with each other.

Setting the timing of the sequence of light flashes may in particular include that each of the plurality of anti-collision lights 120a, 120b, 128a-128c is configured to start its respective sequence of light flashes a pre-set time period T1, T2 after the last activation status message of all respective activation status messages from a predefined set of the plurality of anti-collision lights 120a, 120b, 128a-128c has been received.

The predefined set of the plurality of anti-collision lights 120a, 120b, 128a-128c may include all anti-collision lights 120a, 120b, 128a-128c of the aircraft exterior anti-collision light system 200.

Alternatively, a first predefined set of the anti-collision lights may comprise only the red-flashing beacon lights 120a, 120b, but not the white strobe anti-collision lights 128a-128c. The first predefined set of anti-collision lights may also be referred to as a first group of anti-collision lights, which is the group of anti-collision lights comprising all red-flashing beacon lights 120a, 120b. A second predefined set of the anti-collision lights may comprise only the white strobe anti-collision lights 128a-128c, but not the red-flashing beacon lights 120a, 120b. The second predefined set of anti-collision lights may also be referred to as a second group of anti-collision lights, which is the group of anti-collision lights comprising all white strobe anti-collision lights 128a-128c. The predefined sets of anti-collision lights may also be structured differently, and there may be more or less than two predefined sets of anti-collision lights.

Each of the red-flashing beacon lights 120a, 120b of the first group of anti-collision lights may in particular be configured to start its sequence of light flashes a pre-set first time period T1 after the last one of respective activation status messages have been received from the first group of anti-collision lights, i.e. after the last one of the respective activation status messages have been received from the red-flashing beacon lights 120a, 120b. In consequence, the light flashes, which are emitted by the red-flashing beacon lights 120a, 120b, are synchronized with respect to each other.

Each of the white strobe anti-collision lights 128a-128c of the second group of anti-collision lights may in particular be configured to start its sequence of light flashes a pre-set second time period T2 after the last one of respective activation status messages have been received from the second group of anti-collision lights, i.e. after the last one of the respective activation status messages have been received from the white strobe anti-collision lights 128a-128c. In consequence, the light flashes, which are emitted by the white strobe anti-collision lights 128a-128c, are synchronized with respect to each other.

The first and second time periods T1, T2 may be shorter than 1 second, the first and second time periods T1, T2 may in particular in the range of between 100 ms and 900 ms.

In a configuration, in which the red-flashing beacon lights 120a, 120b have started emitting their light flashes, before the white strobe anti-collision lights 128a-128c have started emitting their light flashes, each of the red-flashing beacon lights 120a, 120b may be configured to re-start its sequence of light flashes the pre-set first time period T1 after the last one of the respective activation status messages has been received from the white strobe anti-collision lights 128a-128c, i.e. after the last one of the respective activation status messages have been received from the second group of anti-collision lights.

Similarly, in a configuration in which the white strobe anti-collision lights 128a-128c have started emitting their light flashes, before the red-flashing beacon lights 120a, 120b have started emitting their light flashes, each of the white strobe anti-collision lights 128a-128c may be configured to re-start its sequence of light flashes the pre-set second time period T2 after the last one of the respective activation status messages has been received from the red-flashing beacon lights 120a, 120b, i.e. after the last one of the respective activation status message have been received from the first group of anti-collision lights.

Such a re-starting of the respective sequences of light flashes may result in an additional synchronization of the light flashes, which are emitted by the first and second groups of anti-collision lights, with respect to each other.

The pre-set second time period T2 may differ from the pre-set first time period T1. The anti-collision lights 120a, 120b, 128a-128c of the first and second groups may be configured to emit their respective sequences of light flashes with the same frequency flash. A difference ΔT=|T2−T1| between the pre-set second time period T2 and the pre-set first time period T1 may be set to a value in the range of between 25% and 75% of a time interval between successive light flashes Tflash=1/flash. The difference ΔT between the pre-set first time period T1 and the pre-set second time period T2 may in particular be set to approximately 25%, 33%, 50%, 67%, or 75% of the time interval Tflash between successive light flashes.

As a result, the first and second groups of anti-collision lights 120a, 120b, 128a-128c may flash in an alternating manner with respect to each other. In other words, the white strobe anti-collision lights 128a-128c may emit their respective light flashes, while the red-flashing beacon lights 120a, 120b are switched off, and the red-flashing beacon lights 120a, 120b may emit their respective light flashes while the white strobe anti-collision lights 128a-128c are switched off.

Figure 4:
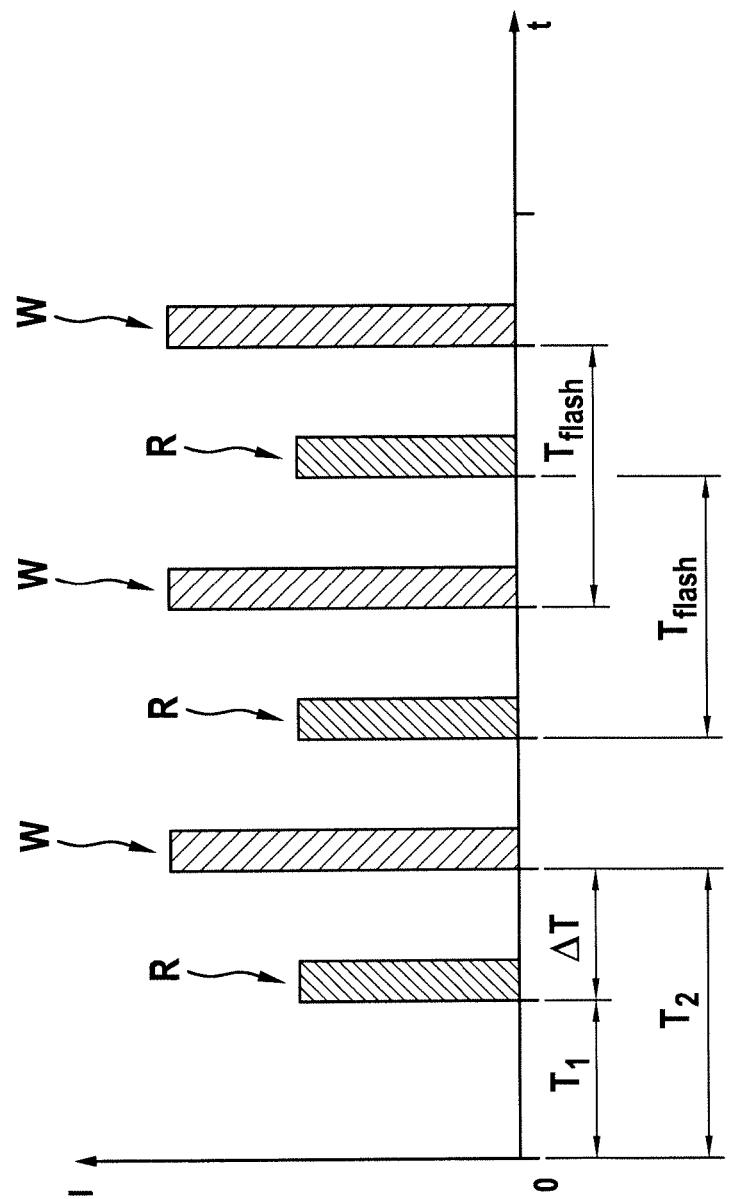
FIG. 4 depicts a diagram, which depicts the red light flashes emitted by the red-flashing beacon lights and the white light flashes emitted by the white strobe anti-collision lights over time.

The result of such a configuration is schematically illustrated in FIG. 4.

FIG. 4 depicts a diagram, in which the intensity I of the red light flashes R, which are emitted by the red-flashing beacon lights 120a, 120b, and the intensity I of the white light flashes W, which are emitted by the white strobe anti-collision lights 128a-128c, are plotted on the vertical axis over time t, which is plotted on the horizontal axis.

The diagram shows that both the red-flashing beacon lights 120a, 120b and the white strobe anti-collision lights 128a-128c flash periodically with the same frequency flash=1/Tflash. The diagram further shows that the flashes W of the white strobe anti-collision lights 128a-128c are offset with respect to the flashes R of the red-flashing beacon lights 120a, 120b by ΔT=Tflash/2.

For providing the above described behaviour, each of the plurality of anti-collision lights 120a, 120b, 128a-128c may be equipped with a controller. Said controller is configured to control access to the bus 210 for transmitting and receiving activation status messages. The controller is further configured to control the timing of the sequence of light flashes, as described herein. The controller may be implemented in hardware, in particular as a dedicated control circuit, or in software, which is run on a microprocessor or other suitable hardware, or in a combination of hardware and software.

In the embodiment of an aircraft exterior anti-collision light system 200, as depicted in FIG. 3, the bus 210 has a bus clock signal 230, which is schematically depicted to the right of FIG. 3. Each of the plurality of anti-collision lights 120a, 120b, 128a-128c is configured to track the bus clock signal 230 on the bus 210 and to use said bus clock signal 230 for maintaining a constant flash frequency flash for its respective sequence of light flashes R, W. The bus 210 may be an RS-485 bus or another suitable clocked bus.

More specifically, in operation, each of the plurality of exterior aircraft lights 120a, 120b, 128a-128c may listen to the bus 210 for detecting the bus clock signal 230, may count the detected pulses of the bus clock signal 230 with a counter 113a-113c, 123a, 123b, and may emit a light flash every time a predefined number of pulses has been counted by the counter 113a-113c, 123a, 123b.

The bus clock signal 230 on the bus 210 may have a bus clock frequency fbus in the range of between 1 kHz and 3000 kHz, more particularly a bus clock frequency fbus in the range of between 500 kHz and 2000 kHz.

Using the bus clock signal 230 for synchronizing the flashing of the plurality of anti-collision lights 120a, 120b, 128a-128c may allow for maintaining the synchronization of the flashes, which are emitted by the plurality of anti-collision lights 120a, 120b, 128a-128c, reliably and with high accuracy.

Figure 5:
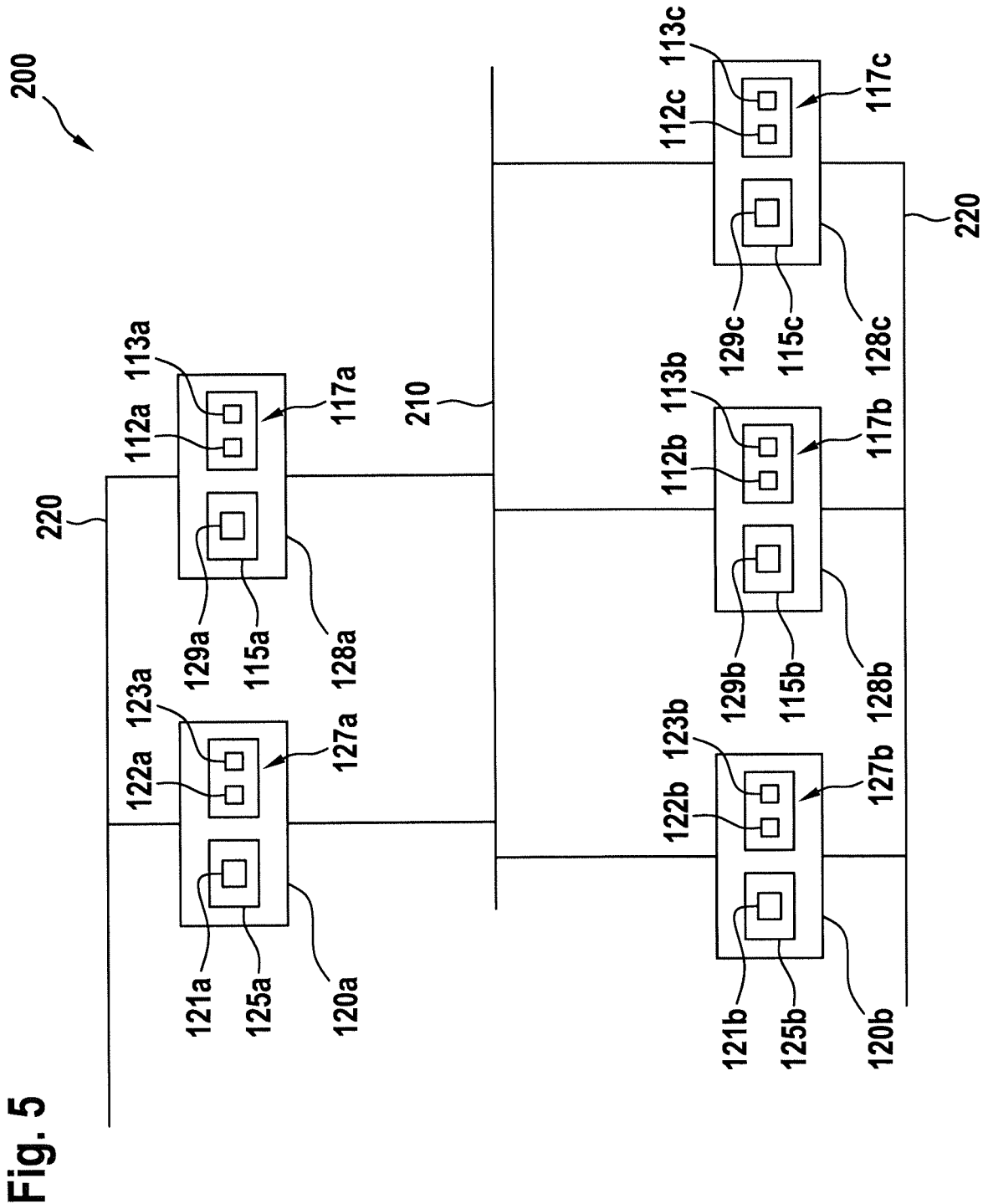
FIG. 5 depicts a schematic block diagram of an aircraft exterior anti-collision light system according to another exemplary embodiment of the invention.

FIG. 5 depicts a schematic block diagram of an aircraft exterior anti-collision light system 200 according to another exemplary embodiment of the invention.

The components of the exterior anti-collision light system 200 depicted in FIG. 5, which correspond to the components of the exterior anti-collision light system 200 depicted in FIG. 3, are denoted with the same reference signs. Analogous components will not be discussed in detail again. Instead, it is referred to the above description of FIG. 3.

In the embodiment depicted in FIG. 5, each of the anti-collision lights 120a, 120b, 128a-128c comprises a timer circuit 117a-117c, 127a, 127b, and the anti-collision lights 120a, 120b, 128a-128c are configured to use their respective timer circuit 117a-117c, 127a, 127b for maintaining a constant flash frequency flash for their respective sequence of light flashes.

Each of the anti-collision lights 120a, 120b, 128a-128c may in particular be configured to emit its respective light flashes R, W based on a trigger, which is periodically provided by the timer circuit 117a-117c, 127a, 127b of the respective anti-collision light 120a, 120b, 128a-128c.

Each timer circuit 117a-117c, 127a, 127b may in particular comprise a real time clock 112a-112c, 122a, 122b, which provides a sequence of periodic clock signals. The periodic clock signals, which are provided by the real time clocks 112a-112c, 122a, 122b of the anti-collision lights 120a, 120b, 128a-128c, may have the same frequency fclock. Each of the plurality of anti-collision lights 120a, 120b, 128a-128c may further comprise a counter 113a-113c, 123a, 123b, which counts the clock signals provided by the respective real time clock 112a-112c, 122a, 122b, and which triggers a light flash R, W of the respective anti-collision light 120a, 120b, 128a-128c every time a predefined number of clock signals has been counted.

The real time clocks 112a-112c, 122a, 122b may provide clock signals with a frequency fclock in the range of between 1 kHz and 3000 kHz, more particularly with a frequency fclock in the range of between 500 kHz and 2000 kHz.

Timer circuits 117a-117c, 127a, 127b with real time clocks 112a-112c, 122a, 122b may reliably provide clock signals with a very constant frequency fclock. They may therefore allow for synchronizing the flashing of the anti-collision lights 120a, 120b, 128a-128c over a long period of time, in particular, over the duration of a complete flight.

Employing timer circuits 117a-117c, 127a, 127b with real time clocks 112a-112c, 122a, 122b for synchronizing the flashing of the anti-collision lights 120a, 120b, 128a-128c may make the synchronization independent of a bus clock signal. In consequence, in such a configuration, the synchronization of the anti-collision lights 120a, 120b, 128a-128c may be maintained, even if the bus clock signal 230 fails or if the connection between an anti-collision light 120a, 120b, 128a-128c and the bus 210 is interrupted or if a bus without a bus clock signal, such as a CAN bus, is used.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Aircraft exterior anti-collision light system, comprising:
    a plurality of anti-collision lights; and
    a bus;
    wherein each of the plurality of anti-collision lights is coupled to the bus;
    wherein each of the plurality of anti-collision lights comprises at least one light source and is configured to emit a sequence of light flashes (R, W);
    wherein each of the plurality of anti-collision lights is configured to carry out an initialization routine in response to an activation command;
    wherein each of the plurality of anti-collision lights is configured to transmit an activation status message on the bus, after the initialization routine has been carried out;
    wherein each of the plurality of anti-collision lights is configured to listen on the bus for activation status messages and to log activation status messages received on the bus;
    wherein each of the plurality of anti-collision lights is configured to set a timing of the sequence of light flashes (R, W) depending on the activation status messages received on the bus.

2. The aircraft exterior anti-collision light system according to claim 1, wherein each of the plurality of anti-collision lights is configured to start the sequence of light flashes (R, W) a pre-set time period after the last one of respective activation status messages have been received from a pre-defined set of the plurality of anti-collision lights.

3. The aircraft exterior anti-collision light system according to claim 1, wherein the plurality of anti-collision lights comprise a plurality of red-flashing beacon lights and/or a plurality of white strobe anti-collision lights.

4. The aircraft exterior anti-collision light system according to claim 1, comprising
    a first group of anti-collision lights, and
    a second group of anti-collision lights,
    wherein each of the first group of anti-collision lights is configured to start the sequence of light flashes (R, W) a pre-set first time period ($T_1$) after the last one of respective activation status messages have been received from the first group of anti-collision lights; and
    wherein each of the second group of anti-collision lights is configured to start the sequence of light flashes (R, W) a pre-set second time period ($T_2$) after the last one of respective activation status messages have been received from the second group of anti-collision lights.

5. The aircraft exterior anti-collision light system according to claim 4, wherein each of the first group of anti-collision lights is configured to re-start the sequence of light flashes (R, W) the pre-set first time period ($T_1$) after the last one of respective activation status messages have been received from the second group of anti-collision lights.

6. The aircraft exterior anti-collision light system according to claim 4, wherein the anti-collision lights of the first and second groups are configured to emit the respective sequences of light flashes (R, W) with the same frequency,
    wherein a difference ($\Delta T$) between the pre-set first time period ($T_1$) and the pre-set second time period ($T_2$) is in the range between 25% and 75% of a time interval ($T_{flash}$) between successive light flashes (R, W), and
    wherein the difference ($\Delta T$) between the pre-set first time period ($T_1$) and the pre-set second time period ($T_2$) is between 25% and 75% of the time interval ($T_{flash}$) between successive light flashes (R, W).

7. The aircraft exterior anti-collision light system according to claim 4,
    wherein the first group of anti-collision lights comprises a plurality of red flashing beacon lights, in particular an upper beacon light, which is to be installed in an upper portion of an aircraft, and a lower beacon light, which is to be installed in a lower portion of an aircraft;
    or
    wherein the second group of anti-collision lights comprises a plurality of white strobe anti-collision lights, in particular a left wing white strobe anti-collision light, a right wing white strobe anti-collision light, and a tail white strobe anti-collision light.

8. The aircraft exterior anti-collision light system according to claim 1, wherein each of the plurality of anti-collision lights is configured to emit the sequence of light flashes (R, W) with a flash frequency ($f_{flash}$) in a range of between 45 flashes and 90 flashes per minute.

9. The aircraft exterior anti-collision light system according to claim 8, wherein the flash frequency ($f_{flash}$) is in the range of between 55 flashes and 65 flashes per minute.

10. The aircraft exterior anti-collision light system according to claim 1, wherein the bus has a bus clock signal and wherein each of the plurality of anti-collision lights is configured to track the bus clock signal and to use said bus clock signal for maintaining a constant flash frequency ($f_{flash}$) for the sequence of light flashes (R, W).

11. The aircraft exterior anti-collision light system according to claim 1, wherein each of the plurality of anti-collision lights comprises a timer circuit and is configured to use said timer circuit for maintaining a constant flash frequency ($f_{flash}$) for the sequence of light flashes (R, W).

12. An aircraft comprising:
    an aircraft exterior anti-collision light system according to claim 1.

13. A method of operating an aircraft exterior anti-collision light system, comprising a plurality of anti-collision lights that are coupled to a common bus, wherein the method includes for each of the plurality of anti-collision lights:
    carrying out an initialization routine in response to an activation command;
    transmitting an activation status message on the bus, after the initialization routine has been carried out;
    listening on the bus for activation status messages and logging activation status messages received on the bus; and
    emitting a sequence of light flashes (R, W), with a timing of the sequence of light flashes (R, W) being set depending on the activation status messages received on the bus.

14. The method according to claim 13, wherein said emitting the sequence of light flashes (R, W) includes starting the sequence of light flashes (R, W) a pre-set time period ($T_1$, $T_2$) after the last one of respective activation status messages have been received from a predefined set of the plurality of anti-collision lights.

15. The method according to claim 13, further including:
issuing a first activation command to a first group of anti-collision lights, wherein the first group of anti-collision lights are in particular a plurality of red flashing beacon lights;
wherein, for each of the first group of anti-collision lights, said emitting the sequence of light flashes (R, W) includes:
starting the sequence of light flashes (R, W) a pre-set first time period ($T_1$) after the last one of respective activation status messages have been received from the first group of anti-collision lights.

16. The method according to claim 15, further including:
issuing a second activation command to a second group of anti-collision lights, wherein the second group of anti-collision lights are in particular a plurality of white strobe anti-collision lights;
wherein, for each of the second group of anti-collision lights, said emitting the sequence of light flashes (R, W) includes starting the sequence of light flashes (R, W) a pre-set second time period ($T_2$) after the last one of respective activation status messages have been received from the second group of anti-collision lights;
wherein, for each of the first group of anti-collision lights, said emitting the sequence of light flashes (R, W) includes in particular re-starting the sequence of light flashes (R, W) the pre-set first time period ($T_1$) after the last one of respective activation status messages has been received from the second group of anti-collision lights.

* * * * *